(12) United States Patent
Silvus

(10) Patent No.: US 7,751,137 B2
(45) Date of Patent: Jul. 6, 2010

(54) METHOD FOR IMPROVING SEQUENCE DETECTION PERFORMANCE BY REMOVING EXCESS PATHS

(75) Inventor: Gregory L. Silvus, Boulder, CO (US)

(73) Assignee: Broadcom Corporation, Irvine, CA (US)

( * ) Notice: Subject to any disclaimer, the term of this patent is extended or adjusted under 35 U.S.C. 154(b) by 819 days.

(21) Appl. No.: 11/557,765

(22) Filed: Nov. 8, 2006

(65) Prior Publication Data

US 2008/0106816 A1 May 8, 2008

(51) Int. Cl.
*G11B 5/09* (2006.01)
(52) U.S. Cl. ............... 360/45; G9B/20.013; 360/51
(58) Field of Classification Search .............. None
See application file for complete search history.

(56) References Cited

U.S. PATENT DOCUMENTS 6,009,549 A * 12/1999 Bliss et al. .............. 714/769
6,052,248 A * 4/2000 Reed et al. .............. 360/53

* cited by examiner

*Primary Examiner*—Daniell L Negrón
(74) *Attorney, Agent, or Firm*—Garlick Harrison & Markison

(57) ABSTRACT

A method leverages knowledge of the actual or ideal bit sequence to improve the performance of any sequence detector. This improved performance results by constraining the sequence detector when the sequence detector has knowledge of known patterns within the sample sequence. Embodiments may control or limit the effects of ISI on a readback signal in order to allow higher storage within physical media such as that of a HDD. This method involves reading an analog waveform from the physical media. The phase of this analog waveform is determined and it is sampled at regular intervals using a timing recovery scheme. This sample sequence is equalized (filtered) and sent to a sequence detector which will compare the received sequence to all possible transmitted sequences, generating a path through a trellis that represents the estimated sequence. That trellis path may pass through known states at certain times. This knowledge makes it possible to remove some of the paths under consideration. Then the sample sequence may be compared to a reduced set of possible bit sequences to select a decoded bit sequence.

18 Claims, 9 Drawing Sheets

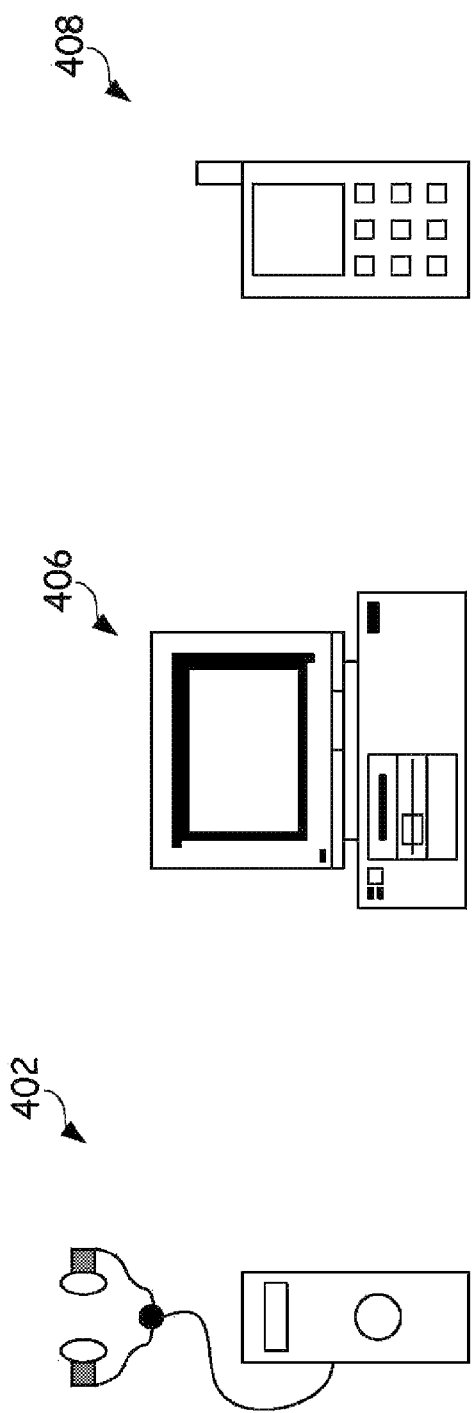

METHOD FOR IMPROVING SEQUENCE DETECTION PERFORMANCE BY REMOVING EXCESS PATHS

TECHNICAL FIELD OF THE INVENTION

Embodiments of the present invention relate generally to data storage and communication devices; and, more particularly, embodiments of the present invention relate to reading data from storage channels and devices and also transmitting data over communications channels and devices.

BACKGROUND OF THE INVENTION

As is known, many varieties of data storage devices (e.g. disk drives, floppy drives, and optical drives including CD, DVD, and Blu-Ray) are used to provide data storage for a host device, either directly, or through a server. The server may be available through a network, such as but not limited to a local area network (LAN), wide area network (WAN), or the Internet, to provide storage area network (SAN) or network attached storage (NAS) Typical host devices include stand-alone computer systems such as a desktop or laptop computer, enterprise storage devices such as servers, storage arrays such as a redundant array of independent disks (RAID) arrays, storage routers, storage switches and storage directors, and other consumer devices that use magnetic and optical storage systems such as video game systems and digital video recorders. These devices provide high storage capacity in a cost effective manner.

Many different communication channels are available. Communications channels allow wired or wireless communications for the transmission of audio, video and data. These wired, wireless and optical communication channels may include fiber optics, laser based communications, satellite based communications, cellular communications, cable communications, radio frequency (RF) and traditional wired and wireless communications. These communications allow for the delivery of video, Internet, audio, voice, and data transmission services throughout the world. By providing communication channels with large bandwidth capacity, communications channels facilitate the exchange of information between people in an ever shrinking global environment.

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

All information stored on the hard disk is recorded in tracks, which are concentric circles organized on the surface of the platters. FIG. 1 depicts a pattern of radially-spaced concentric data tracks 102 within a disk 100. Data stored on the disks may be accessed by moving RW heads radially as driven by a head actuator to the radial location of the track containing the data. To efficiently and quickly access this data, fine control of RW hard positioning is required. The track-based organization of data on the hard disk(s) allows for easy access to any part of the disk, which is why hard disk drives are called "random access" storage devices.

Each track is broken down into subunits of sectors. Sectors, in turn, are composed of some number of bytes. This number of bytes can vary greatly from device to device, but is typically (although not necessarily) constant within a given device. The hierarchy of storage units (tracks, sectors, bytes) provides design flexibility. Each sector contains user information that has been encoded to facilitate retrieval of the information. The encoding is performed in many steps and these steps vary from device to device, but again, are typically constant within a given device. The encoding steps include, but are not limited to addition of a preamble (bits prepended to the data sector to facilitate determination of the phase of the analog data signal from the disc), a sync mark (bits placed between the preamble and encoded user data to identify the start of the encoded user data), modulation coding (any scheme that makes the user data easier to read by the reading mechanism of the device; this type of encoding "transforms" the bit sequence, often making it substantially different in appearance from the original user data), and error correction coding (bits appended to the encoded user data that allows correction of some limited number of errors that may have occurred during retrieval). The main point is that several common (but variable) procedures are invoked to improve the robustness and readability of the data stored in the device.

Within such hard disk drives (HDDs), disk drive controllers control the various processes associated with the read/write of data to the physical media. As the amount of data stored to the physical media increases, the ability to accurately read data from the physical media is adversely effected. One factor affecting the ability to accurately read this data is inter symbol interference (ISI). ISI is the process by which nearby symbols interact with each other in a detrimental way. Although discussed here as a problem associated with HDDs, this problem may be present within any communication channel.

To allow higher storage within physical media such as that of a hard disk drive (HDD), one solution in telecommunications and data storage has been to intentionally write symbols close together and utilize the Viterbi algorithm (or any other sequence detector) and knowledge of how the symbols interact to recover the bit sequence from a noisy analog signal. When applying this solution, the data interferes in a controlled manner and additionally becomes distorted by noise and/or other interfering signals. This noise and interfering signals must be overcome in order to properly read back the pattern of "1's" and "0's" correctly. The Viterbi algorithm is an efficient dynamic programming algorithm that finds the most likely sequence of bits received by comparing a received sequence of points sampled from the analog read back waveform to every possible sequence of bits transmitted. This best sequence is referred to as the "best path through the trellis." The trellis tracks all possible paths and consists of states, which help track the bit decisions associated with the path through them. Other techniques design symbols that are more robust against ISI. Decreasing the symbol rate (the "baud rate"), and keeping the data bit rate constant (by coding more bits per symbol), reduces inter symbol interference.

A sizable market has developed for these data storage devices and the price per unit of storage has steadily dropped. A similar market has developed for high capacity communication channels. As increased capacity within communication channels and data storage devices are provided, the need to retrieve data from these communication channels and data storage devices with greater accuracy grows.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 4A through 4E illustrate various devices that employ hard disk drives unit in accordance with embodiments of the present invention;

DETAILED DESCRIPTION OF THE INVENTION

Preferred embodiments of the present invention are illustrated in the FIGs., like numerals being used to refer to like and corresponding parts of the various drawings.

Embodiments of the present invention provide a method that leverages knowledge of the ideal bit sequence to improve the performance of any sequence detector, such as but not limited to a Viterbi Algorithm, a "Soft-Output Viterbi Algorithm (SOVA)" or Bahl, Cocke, Jelinek, and Raviv (BCJR) detector. This improved performance results by constraining the sequence detector when the sequence detector has read a known pattern. One set of embodiments control or limit the effects of inter symbol interference (ISI) on a readback signal.

One set of embodiments of the present invention provides a method to control ISI (or more generally, overcome noise and interference) in order to allow greater storage capacity at reduced cost within physical media such as that within a variety of data storage devices (e.g. disk drives, floppy drives, hard disk drive (HDD), and optical drives including CD, DVD, and Blu-Ray). This method involves reading an analog waveform from the physical media. The phase of this analog waveform is determined and the analog waveform is sampled at regular intervals using a timing recovery scheme. This sample sequence is equalized (filtered) and sent to a sequence detector which compares the received sequence to all possible transmitted sequences, generating a path through a trellis that represents the estimated sequence. That trellis path may pass through known states at certain times. For example, the known bit sequence may include a preamble, synchronization (sync) mark, data, and postamble. Knowledge of the ideal or actual bit sequences at certain time instances makes it possible to remove some of the trellis paths under consideration, hence improving performance of the sequence detector. Any dis-allowed bit sequences (i.e. trellis paths) may be pruned from the set of possible bit sequences based on knowledge of the ideal or actual bit sequence. Then the sample sequence may be compared to a set of possible bit sequences to select a decoded bit sequence.

Figure 1:
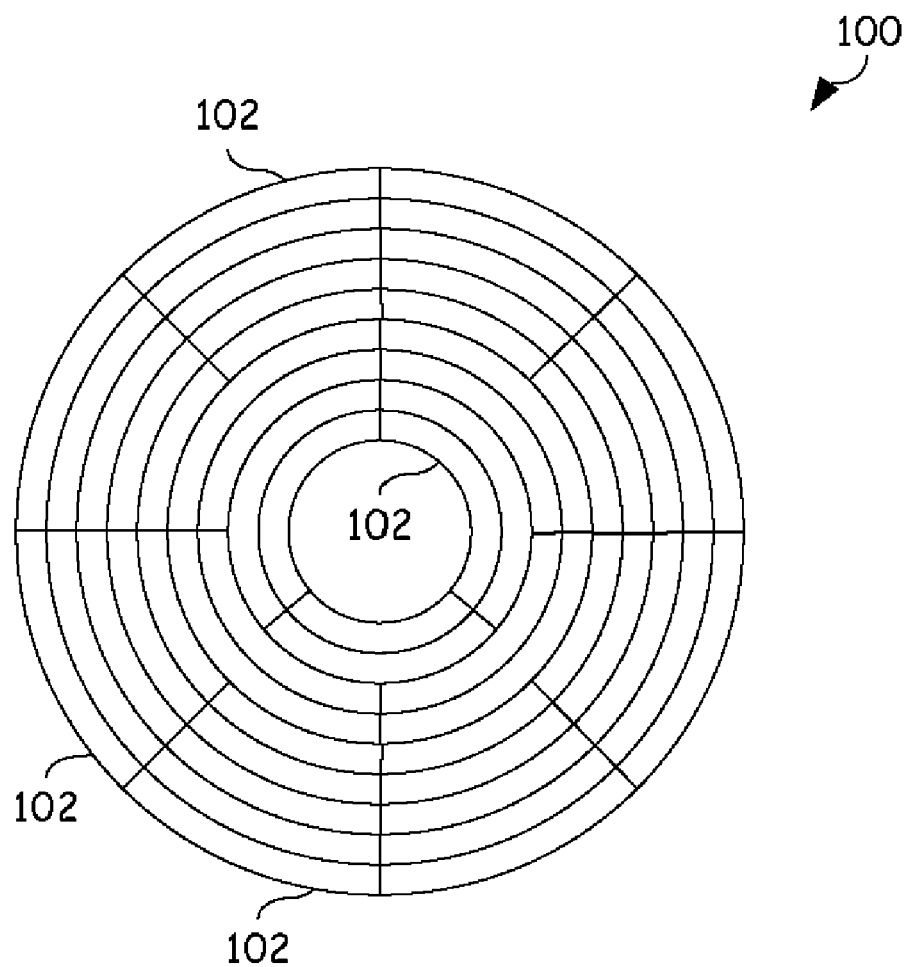
FIG. 1 depicts a prior art pattern of radially-spaced concentric data tracks within the magnetic media of a disk.
Figure 2:
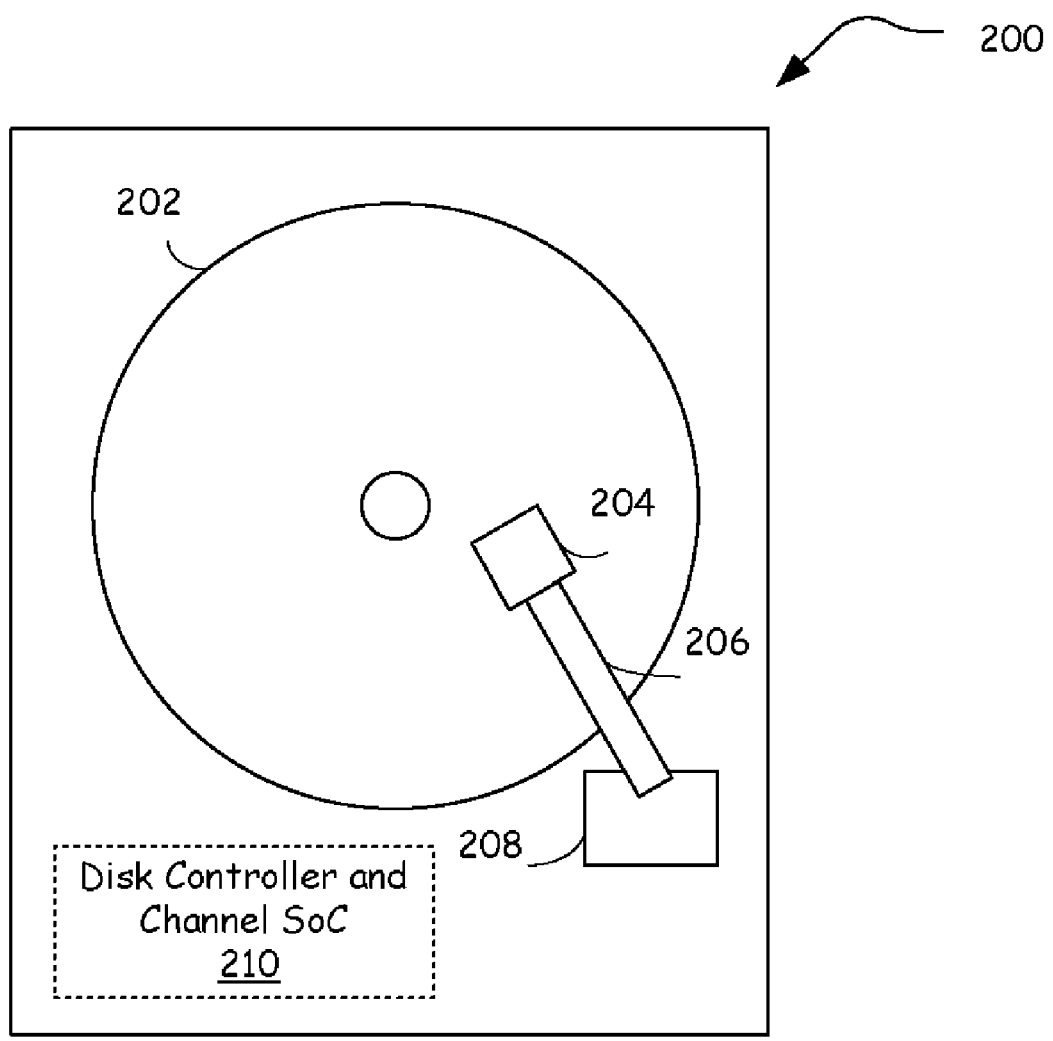
FIG. 2 illustrates an embodiment of a disk drive unit in accordance with embodiments of the present invention.

FIG. 2 illustrates a disk drive unit 200 that may utilize a method of controlling ISI (or more generally, overcome noise and interference) within data readback from physical media in accordance with embodiments of the present invention. In particular, disk drive unit 200 includes a disk 202 that is rotated by a servo motor (not specifically shown) at a velocity such as 3600 revolutions per minute (RPM), 4200 RPM, 4800 RPM, 5,400 RPM, 7,200 RPM, 10,000 RPM, 15,000 RPM, however, other velocities including greater or lesser velocities may likewise be used, depending on the particular application and implementation in a host device. In one possible embodiment, disk 202 can be a magnetic disk that stores information as magnetic field changes on some type of magnetic medium. The medium can be a rigid or non-rigid, removable or non-removable, that consists of or is coated with magnetic material. Data may be written to the media using either longitudinal recording or perpendicular recording techniques. Longitudinal recording techniques, as the name indicates, align the data bits horizontally, parallel to the surface of the disk and in line with the direction of the track. In contrast, perpendicular recording techniques align the bits vertically, perpendicular to the disk, which allows additional room on a disk to pack more data, thus, enabling higher recording densities.

Disk drive unit 200 further includes one or more read/write heads 204 that are coupled to arm 206 that is moved by actuator 208 over the surface of the disk 202 either by translation, rotation or both. A disk controller and channel (DCC) system on a chip (SOC) 210 is included for controlling the read and write operations to and from the drive, for controlling the speed of the servo motor and the motion of actuator 208, and for providing an interface to and from the host device.

Methods of improving the performance of any sequence detector, such as a Viterbi Algorithm, a SOVA or BCJR detector by constraining the sequence detector when the sequence detector has read a known pattern will be discussed with reference to FIG. 5 and following. One set of embodiments to be discussed will apply these methods to overcome, control or limit the effects of noise and/or interfering signals (i.e. ISI) on a read back signal that noise and/or interfering signals has degraded. The disk controller and the channel may be implemented within a single chip as DCC-SOC 210. Other embodiments may implement this functionality with a series of communicatively coupled chips or integrated circuits.

Figure 3:
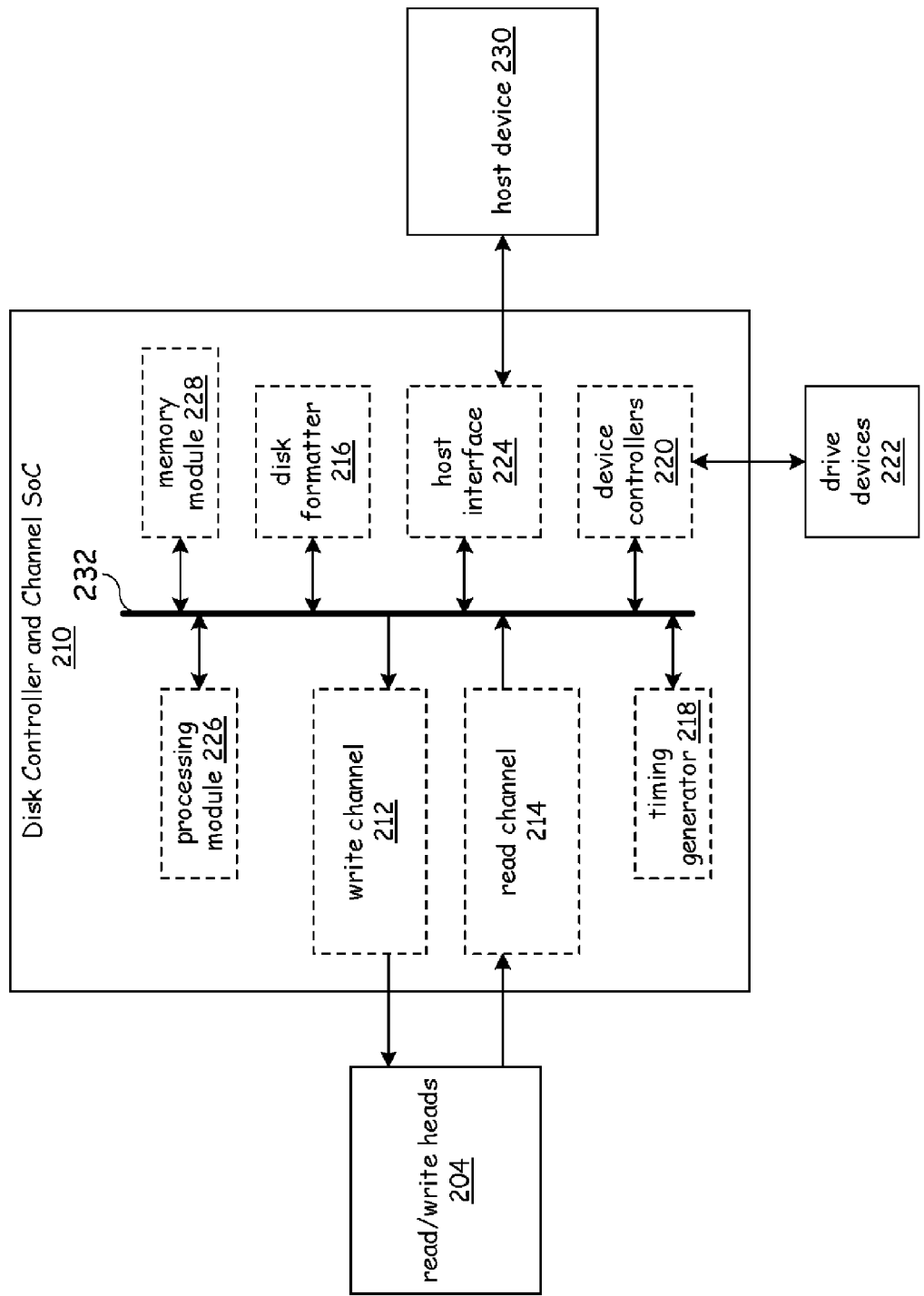
FIG. 3 illustrates an embodiment of a disk controller and channel system on a chip (SOC) in accordance with embodiments of the present invention.

FIG. 3 illustrates an embodiment of a DCC-SOC 210. DCC-SOC 210 includes a read channel 214 and write channel 212 for reading and writing data to and from disk 202 through read/write heads 204. Disk formatter 216 is included for controlling the formatting of disk drive unit 200, timing generator 218 provides clock signals and other timing signals, device controllers 220 control the operation of drive devices 222 such as actuator 208 and the servo motor, etc. Host interface 224 receives read and write commands from host device 230 and transmits data read from disk 202 along with other control information in accordance with a host interface protocol. In one possible embodiment, the host interface protocol can include, SCSI, SATA, enhanced integrated drive electronics (EIDE), or any number of other host interface protocols, either open or proprietary, that can be used for this purpose.

DCC-SOC 210 further includes a processing module 226 and memory module 228. Processing module 226 can be implemented using one or more microprocessors, micro-controllers, digital signal processors (DSPs), microcomputers, central processing units (CPUs), field programmable gate arrays (FPGAs), programmable logic devices (PLAs), state machines, logic circuits, analog circuits, digital circuits, and/or any devices that manipulates signal (analog and/or digital) based on operational instructions that are stored in memory module 228. When processing module 226 is implemented with two or more devices, each device can perform the same steps, processes or functions in order to provide fault tolerance or redundancy. Alternatively, the function, steps and processes performed by processing module 226 can be split between different devices to provide greater computational speed and/or efficiency.

Memory module 228 may be a single memory device or a plurality of memory devices. Such a memory device may be a read-only memory (ROM), random access memory (RAM), volatile memory, non-volatile memory, static random access memory (SRAM), dynamic random access memory (DRAM), flash memory, cache memory, and/or any device that stores digital information. Note that when the processing module 226 implements one or more of its functions via a state machine, analog circuitry, digital circuitry, and/or logic circuitry, the memory module 228 storing the corresponding operational instructions may be embedded within, or external to, the circuitry comprising the state machine, analog circuitry, digital circuitry, and/or logic circuitry. Further note that, the memory module 228 stores, and the processing module 226 executes, operational instructions that can correspond to one or more of the steps or a process, method and/or function illustrated herein.

DCC-SOC 210 includes a plurality of modules, in particular, device controllers 220, processing timing generator 218, processing module 226, memory module 228, write channel 212, read channel 214, disk formatter 216, and host interface 224 that are interconnected via bus 232. Each of these modules can be implemented in hardware, firmware, software or a combination thereof, in accordance with the broad scope of the present invention. While the particular bus architecture is shown in FIG. 3 with a single bus 232, alternative bus architectures that include additional data buses, further connectivity, such as direct connectivity between the various modules, are likewise possible to implement additional features and functions.

In one possible embodiment, one or more (possible all) modules of DCC-SOC 210 are implemented as embedded systems within a SOC integrated circuit. In such a possible embodiment, this SOC integrated circuit includes a digital portion that can include additional modules such as protocol converters, linear block code encoding and decoding modules, etc., and an analog portion that includes device controllers 220 and optionally additional modules, such as a power supply, etc. In an alternative embodiment, the various functions and features of disk controller and channel are implemented in a plurality of integrated circuit devices that communicate and combine to perform the functionality of DCC-SOC 210.

FIGS. 4A through 4E illustrate various devices that employ hard disk drives unit in accordance with embodiments of the present invention. FIG. 4A illustrates an embodiment of a handheld audio unit 402. In particular, disk drive unit 200 can be implemented in the handheld audio unit 402. In one possible embodiment, the disk drive unit 200 can include a small form factor magnetic hard disk whose disk 202 has a diameter 1.8" or smaller that is incorporated into or otherwise used by handheld audio unit 402 to provide general storage or storage of audio content such as motion picture expert group (MPEG) audio layer 3 (MP3) files or Windows Media Architecture (WMA) files, video content such as MPEG4 files for playback to a user, and/or any other type of information that may be stored in a digital format.

FIG. 4B illustrates an embodiment of a computer 406. In particular, disk drive unit 200 can be implemented in the computer 406. In one possible embodiment, disk drive unit 200 can include a small form factor magnetic hard disk whose disk 202 has a diameter 1.8" or smaller, a 2.5" or 3.5" drive or larger drive for applications such as enterprise storage applications. Disk drive 200 is incorporated into or otherwise used by computer 406 to provide general purpose storage for any type of information in digital format. Computer 406 can be a desktop computer, or an enterprise storage devices such a server, of a host computer that is attached to a storage array such as a redundant array of independent disks (RAID) array, storage router, edge router, storage switch and/or storage director.

FIG. 4C illustrates an embodiment of a wireless communication device 408. In particular, disk drive unit 200 can be implemented in the wireless communication device 408. In one possible embodiment, disk drive unit 200 can include a small form factor magnetic hard disk whose disk 202 has a diameter 1.8" or smaller that is incorporated into or otherwise used by wireless communication device 408 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats that may be captured by an integrated camera or downloaded to the wireless communication device 408, emails, webpage information and other information downloaded from the Internet, address book information, and/or any other type of information that may be stored in a digital format.

In a possible embodiment, wireless communication device 408 is capable of communicating via a wireless telephone network such as a cellular, personal communications service (PCS), general packet radio service (GPRS), global system for mobile communications (GSM), and integrated digital enhanced network (iDEN) or other wireless communications network capable of sending and receiving telephone calls. Further, wireless communication device 408 is capable of communicating via the Internet to access email, download content, access websites, and provide steaming audio and/or video programming. In this fashion, wireless communication device 408 can place and receive telephone calls, text messages such as emails, short message service (SMS) messages, pages and other data messages that can include attachments such as documents, audio files, video files, images and other graphics.

FIG. 4D illustrates an embodiment of a personal digital assistant (PDA) 404. In particular, disk drive unit 200 can be implemented in the personal digital assistant (PDA) 404. In one possible embodiment, disk drive unit 200 can include a small form factor magnetic hard disk whose disk 202 has a diameter 1.8" or smaller that is incorporated into or otherwise used by personal digital assistant 404 to provide general storage or storage of audio content such as motion picture expert group (MPEG) audio layer 3 (MP3) files or Windows Media Architecture (WMA) files, video content such as MPEG4 files, JPEG (joint photographic expert group) files, bitmap files and files stored in other graphics formats, emails, webpage information and other information downloaded from the Internet, address book information, and/or any other type of information that may be stored in a digital format.

FIG. 4E illustrates an embodiment of a laptop computer 410. In particular, disk drive unit 200 can be implemented in the laptop computer 410. In one possible embodiment, disk drive unit 200 can include a small form factor magnetic hard disk whose disk 202 has a diameter 1.8" or smaller, or a 2.5"

drive. Disk drive 200 is incorporated into or otherwise used by laptop computer 406 to provide general purpose storage for any type of information in digital format.

Overcoming noise and interfering signals (i.e. overcoming/limiting/controlling ISI) allows higher storage within physical media such as that of a hard disk drive (HDD). In other embodiments, addressing these issues may allow an increase in the amount of data transmitted within communication channels. These methods involve reading an analog waveform from a physical media or communication channel. Then a sample sequence may be derived from that waveform. This sample sequence represents a bit sequence having predetermined known bit sub-patterns embedded in it. For example, the bit sequence may include a preamble, sync mark, data, and postamble. Because a sequence detector compares the received pattern to the patterns generated by every possible bit sequence, knowledge of the ideal or actual bit sequences and their components allows us to reduce the set of possible bit sequences considered. Leveraging knowledge of known patterns allows a sequence detector to "enforce" the existence of these known patterns when decoding the sample sequence to produce a bit sequence.

The phase of this analog waveform is determined and the analog waveform is sampled at regular intervals using a timing recovery scheme. A continuous analog signal is read from the disk. By examining peaks and valleys in this continuous analog signal, one can determine where to "sample" the signal to produce a discrete sample sequence that represents the analog signal. The sample sequence is sent to the sequence detector (i.e. Viterbi algorithm) where the sequence detector determines the bit sequence most likely represented by the sample sequence. The set of possible bit sequences may be pruned based on knowledge of the ideal bit sequence. Then the sample sequence may be compared to a reduced set of possible bit sequences to select the decoded bit sequence.

Figure 5:
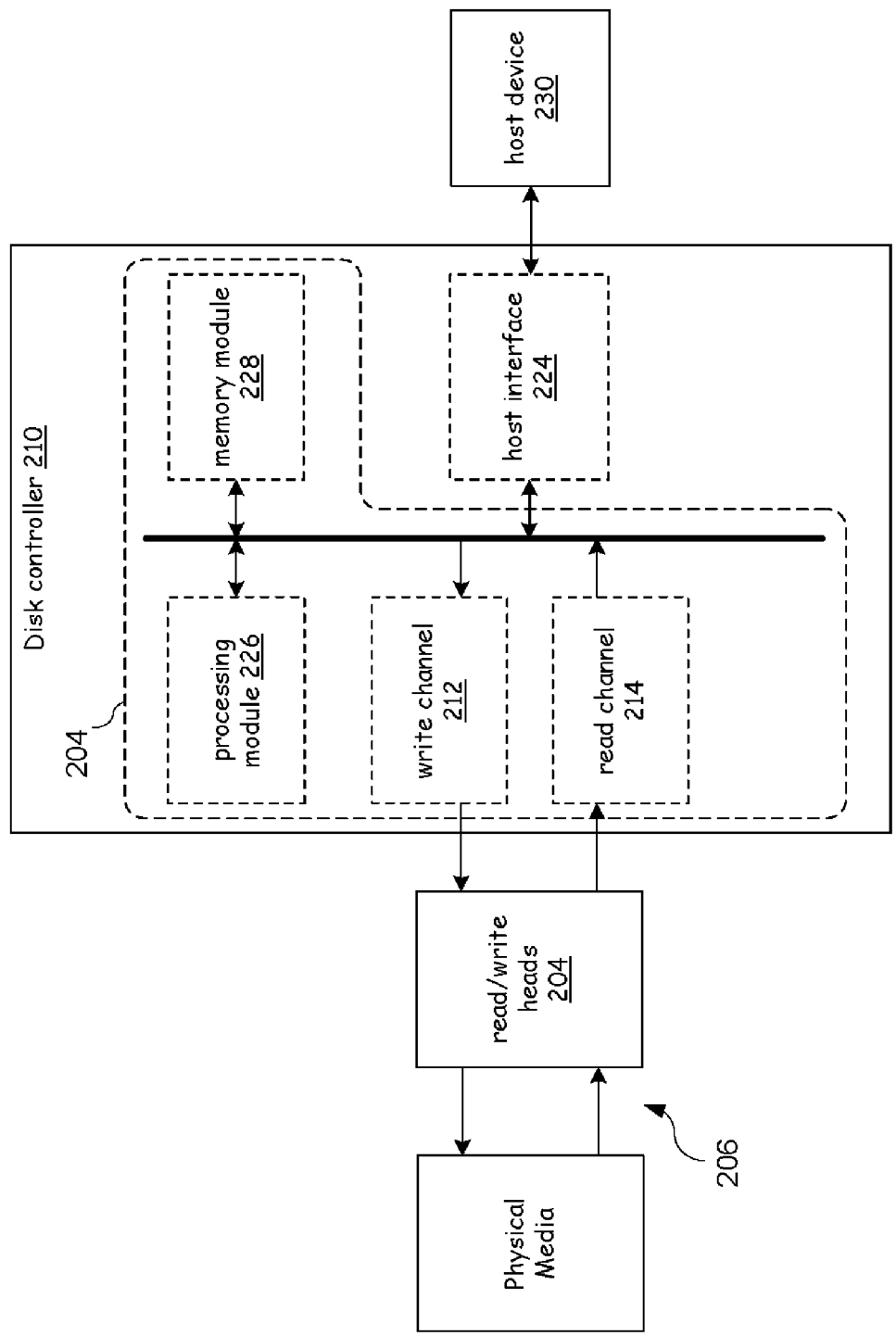
FIG. 5 depicts another embodiment of a disk controller and channel (DCC) SOC in accordance with embodiments of the present invention.

FIG. 5 depicts another embodiment of a DCC-SOC 210 in accordance with embodiments of the present invention. In this embodiment, DCC-SOC 210 includes a read channel 214, data path 204, and host interface 224. Data path 204 may include processing module 226 and memory module 228. These have been described with reference to FIG. 3. The data path may receive an analog waveform which will be sampled to produce a sample sequence from which a bit sequence may be estimated. The data path receives the sampled sequence, and may then prune this set of possible bit sequences based on knowledge of the ideal or actual bit sequence at certain points in time. The sample sequence may then be compared to the remaining set of possible bit sequences to select the decoded bit sequence.

Figure 6:
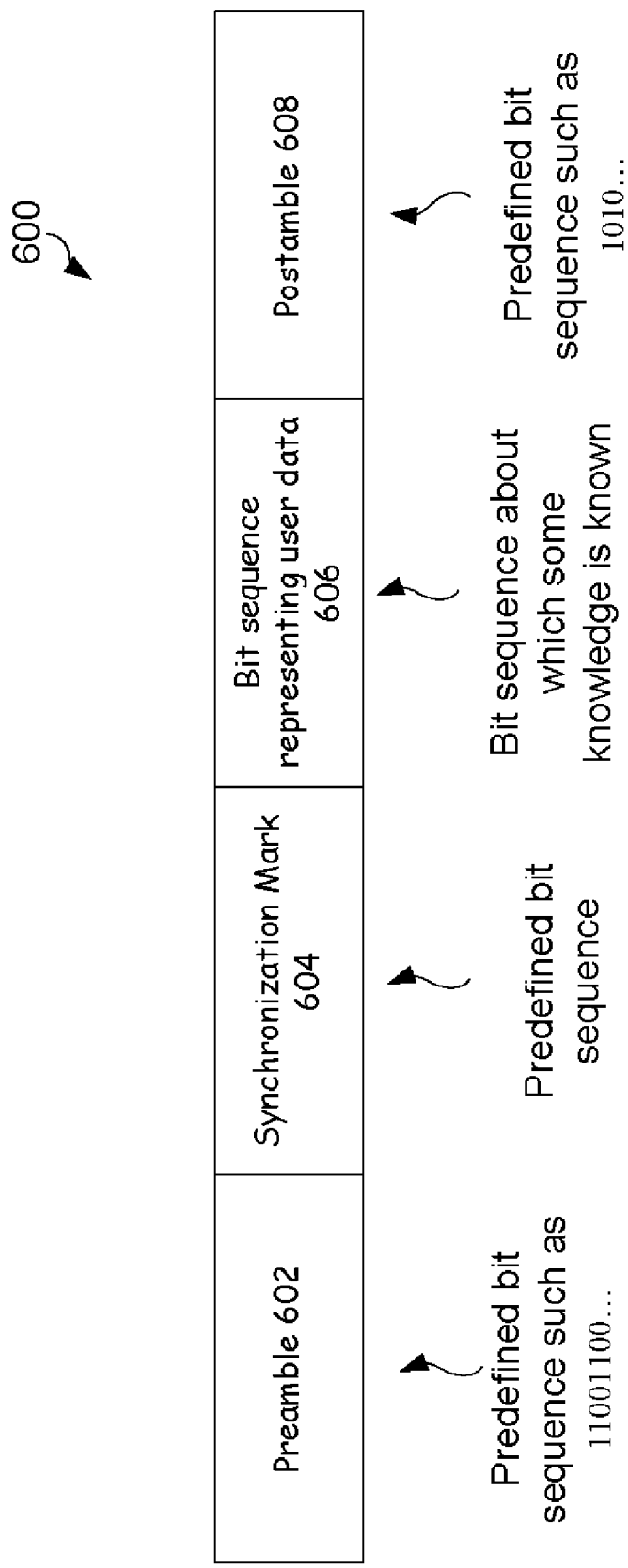
FIG. 6 depicts one possible configuration of how data or bit patterns are written to the disk within the data sector in accordance with embodiments of the present invention.

FIG. 6 depicts one possible configuration of how data or bit patterns are written to the disk within the data sector. As shown in FIG. 6, bit sequences 600 written to a data sector within a HDD and include a preamble 602, sync mark 604, data 606 (that may be composed of multiple code words) and/or postamble 608. Specific knowledge about the format of each of these sequences may be used to properly decode the bit sequence. For example, the preamble may be a predefined series of bits, such as 11001100 . . . . This series as read may appear to be a sine wave. Finding this known portion of the signal allows the disk controller to determine the phase of the analog waveform and determine the alignment of other components within the sample sequence. Thus the hard disk drive controller may determine what portion of the bit sequence within the data sector is currently being examined. Sync mark 604 follows preamble 602. Sync mark 604 must be a known, predetermined bit pattern that identifies where data 606 begins. Furthermore, in addition to uniquely identifying the start of data 606, the sync mark is designed not to be confused with the preamble. Postamble 608 follows data 606. Again, postamble 608 may be a known bit sequence. For example, the bit sequence 101010 . . . may be chosen as the postamble. Thus, the data path will have prior knowledge of preamble 602, sync mark 604 and postamble 608 which ideally are predetermined bit patterns.

Returning to FIG. 5 the operations of the data path (i.e. disc controller and channel) will be described in further detail. To identify the bit sequence, the channel reads the analog waveform from the physical media. The phase of this analog waveform is determined and it is sampled at regular intervals using a timing recovery scheme. This sample sequence is sent to a sequence detector which compares the received sequence to all possible transmitted sequences, generating a path through a trellis that represents the estimated sequence. That trellis path may pass through known states at certain times. For example, the known bit sequence may include the preamble, sync mark, data, and postamble as discussed with reference to FIG. 6. Knowledge of the ideal bit sequences at certain time instances makes it possible to remove some of the paths (i.e. possible bit sequences) under consideration, hence improving performance of the sequence detector. Dis-allowed bit sequences may be pruned from the set of possible bit sequences. Then the sample sequence may be compared to a set of possible bit sequences to select a decoded bit sequence.

The post-amble may be selected as a high frequency, low DC content signal. This is particularly useful in formats where data is written to the disk or physical media using perpendicular recording. This high frequency, low DC content signal helps to prevent baseline wander which may be observed within a disk drive utilizing perpendicular recording. Knowledge of the bit sequence within the data sector allows one to prune dis-allowed states. The pruning of the dis-allowed bit sequences then reduces the number of bit sequences within the set of possible bit sequences to be compared to the estimated sample sequence in order to properly select the decoded bit sequence.

Pruning the dis-allowed bit sequence may be done based on knowledge of every portion of the above-described data sector. First the set of possible bit sequences may be pruned based on the preamble. For example, bit sequences (states or trellises) not following the predetermined bit sequence can be pruned (removed, reprioritized, or labeled as dis-allowed) from the set of possible bit sequences. Next the set of possible bit sequences may be further pruned based on knowledge of the sync mark. The sync mark may have an exact predetermined sequence. The bit sequences (trellis paths) within the set of possible bit sequences that do not conform to the constraints of the sync mark may then be removed. Next, code words within the data portion of the bit sequence allow the set of possible bit sequences to be further pruned. For example, the parity of the code words may be known. This would allow those bit sequences not having code words with the proper parity to be pruned. The postamble, which comprises a predetermined bit sequence, allows further pruning of the allowed bit sequences.

Any sequence detector, such as, but not limited to a Viterbi Algorithm, a SOVA or BCJR detector, may then be employed to determine the bit sequence. Embodiments of the present invention prune the set of possible bit sequences with knowledge of known pattern(s) within the ideal bit sequence to improve system performance. This knowledge eliminates the need for the sequence detector to examine every possible bit sequence. Thus, the decoding process is streamlined even where a small number of possible bit sequences are removed.

Figure 7:
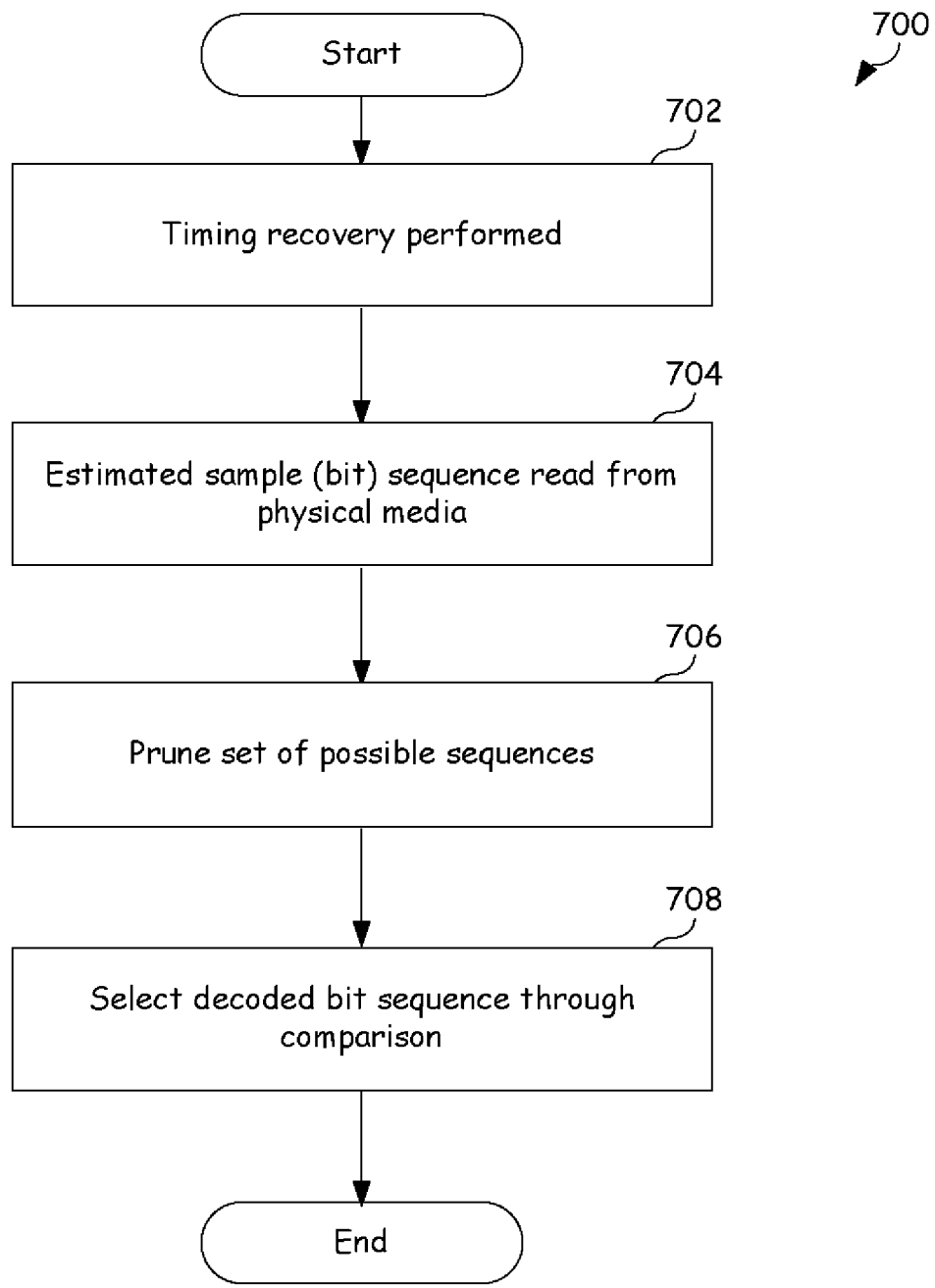
FIG. 7 provides a logic flow diagram of a method to control ISI in accordance with embodiments of the present invention.

FIG. 7 provides a logic flow diagram of a method to control, limit, or overcome ISI in accordance with embodiments of the present invention. Operations 700 begin with Step 702 where a timing recovery scheme is performed. Timing recovery determines phase and timing interval at which the analog waveform is sampled. In step 704 a sample sequence is determined by the channel based on the analog waveform read from the physical media (i.e. disk in an HDD) or communication channel. The bit sequence that the sample sequence represents may have a pre-defined format similar to that discussed with reference to FIG. 6. This sample sequence is equalized (filtered) and sent to a sequence detector. In general, a sequence detector compares the received sample sequence to every possible sequence. However, embodiments of the present invention streamline this process by pruning (i.e. removing) dis-allowed bit sequences from the set of possible sequences in step 706.

The set of possible bit sequences may be pruned based on knowledge of the ideal or actual bit sequence at certain time instants. Thus, with specific knowledge of the preamble, sync mark, data, and postamble one can prune the available (i.e. reduce the number of) possible bit sequences. In Step 708 the sample sequence may be compared to the reduced set of possible bit sequences in order to select a bit sequence as the decoded bit sequence.

Figure 8:
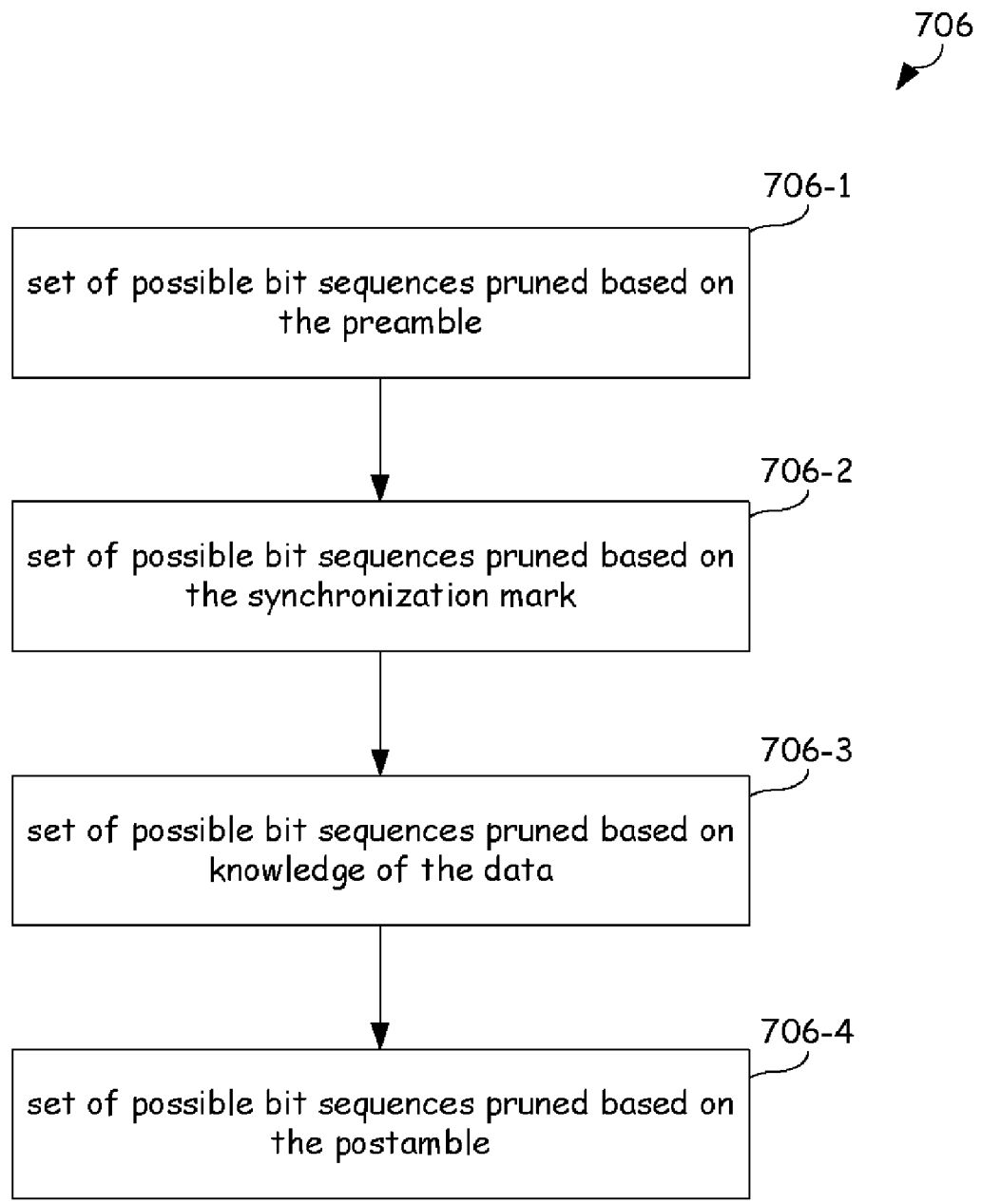
FIG. 8 lists how pruning of the set of possible bit sequences may be divided into multiple steps in accordance with embodiments of the present invention.

As shown in FIG. 8, pruning of the set of possible bit sequences may be based on any known pattern within the ideal bit sequence to improve system performance. For example, for a bit sequence having a format as described with reference to FIG. 6, the pruning of the set of possible bit sequences may be based on knowledge of four portions of the ideal bit sequence. As shown here, Step 706 of FIG. 7 is divided into four components. In step 706-1 the set of possible bit sequences may be pruned based on knowledge of the preamble. The preamble may be made of a pre-determined bit sequence such as the bit pattern 11001100 . . . . In Step 706-2 the set of possible bit sequences may then be further pruned based on specific knowledge of the sync mark. The sync mark may have a pre-determined bit sequence located at the end of the preamble. In Step 706-3 the set of possible bit sequences may be pruned based on parity of data code words within the data portion of the bit sequence. For example, allowable bit sequences having data code words with odd parity may be excluded in favor of those having even parity. Further, more than one date code word may be present within the data. Therefore, there may be multiple constraints within the data to further prune or reduce the set of possible bit sequences. Then, in Step 706-4 the set of possible bit sequences may be pruned based on the pre-determined bit sequence of the postamble. By pruning the choices, i.e. reducing the number of possible bit sequences, a sequence detector such as but not limited to the decoding technique provided by the Viterbi algorithm may show significantly improved decisions in the region of the pruning.

Returning to FIG. 8 pruning is the removal of dis-allowed bit sequences. For example, some algorithms may compare the distance between the sample sequence and possible bit sequence(s) and then select the possible bit sequence having the least distance from the sample sequence. Where the distance between the sample sequence and possible bit sequence(s) is large, these possible bit sequence(s) may be automatically reprioritized as a dis-allowed bit sequence (i.e. essentially being removed from the set of possible bit sequences). Dis-allowed bit sequences may be removed from the set of possible bit sequence(s) by setting the distance between the estimated and dis-allowed bit sequence to a large value. This eliminates the need for the sequence detector to actually determine a distance between the sample sequence and possible bit sequence(s), although in practice the hardware computes the distances as it normally would. The computed distance is overridden by the large pruning value. The decoded bit sequence is selected from only those possible bit sequences that conform to constraints such as those identified above or other physical constraints associated with the data.

Figure 9:
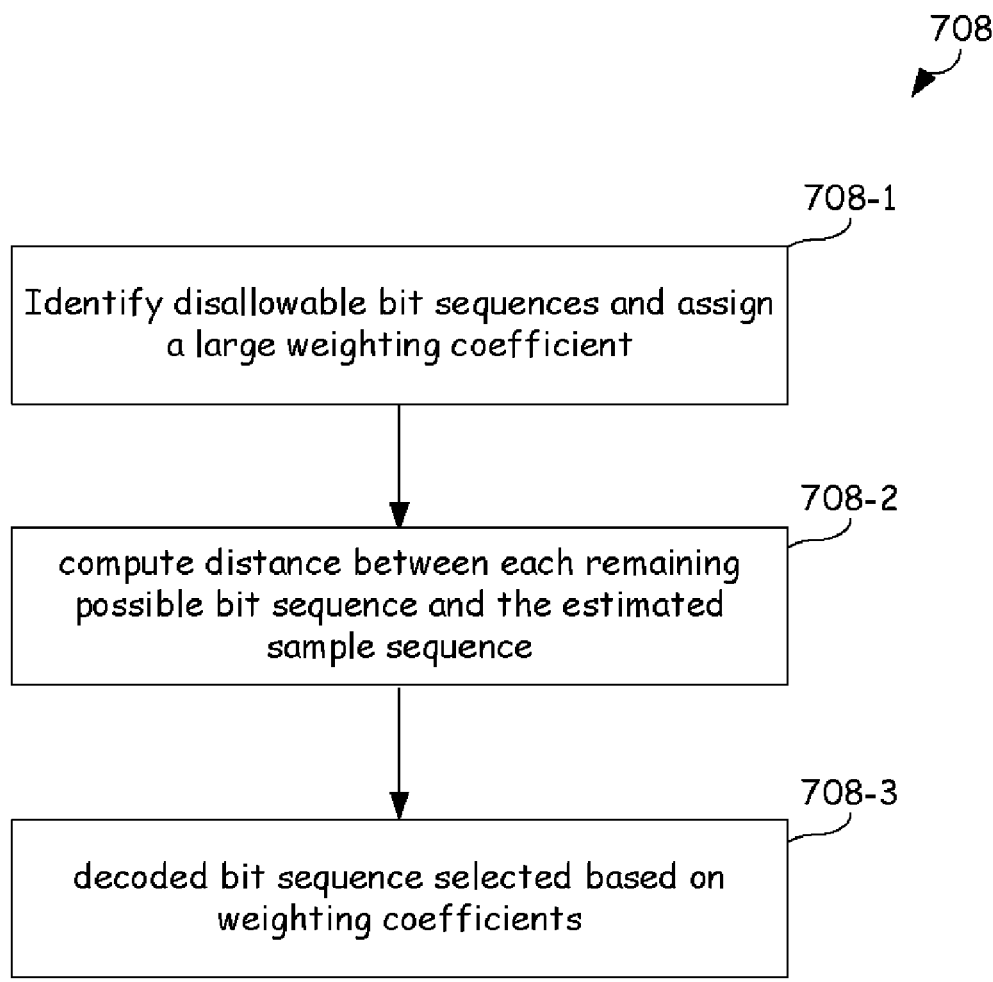
FIG. 9 describes how dis-allowed bit sequences may be reprioritized (pruned) from the set of possible bit sequences in accordance with embodiments of the present invention.

Comparing the estimated sample sequence to all possible sample sequences may be divided into multiple steps. As shown in FIG. 9, Step 708 is divided into multiple steps. In step 708-1 possible bit sequences that are dis-allowed are identified and assigned a large weighting coefficient. The identification of dis-allowed bit sequences can be based on physical constraints imposed by the data sector to limit the number of allowed bit sequences. Step 708-2 computes the distance between each remaining possible bit sequence and the sample sequence. A weighting coefficient could then be assigned to each remaining possible bit sequence based on the computed distance in step 708-2. In step 708-3, the decoded bit sequence may be selected from the set of possible bit sequences as the possible bit sequence having the least distance from the sample sequence.

In summary, embodiments of the present invention provide a method that leverages knowledge of the actual or ideal bit sequence to improve the performance of any sequence detector, such as but not limited to a Viterbi Algorithm, a "Soft-Output Viterbi Algorithm (SOVA)" or Bahl, Cocke, Jelinek, and Raviv (BCJR) detector. This improved performance results by constraining the sequence detector when the sequence detector has knowledge of known patterns within the sample sequence. One set of embodiments control or limit the effects of ISI on a readback signal in order to allow higher storage within physical media such as that of a HDD. This method involves reading an analog waveform from the physical media. The phase of this analog waveform is determined and it is sampled at regular intervals using a timing recovery scheme. This sample sequence is equalized (filtered) and sent to a sequence detector which will compare the received sequence to all possible transmitted sequences, generating a path through a trellis that represents the estimated sequence. That trellis path may pass through known states at certain times. For example, the known bit sequence may include a preamble, synchronization (sync) mark, data, and postamble. Knowledge of the ideal bit sequences at certain time instances makes it possible to remove some of the paths under consideration, hence improving performance of the sequence detector. Any dis-allowed bit sequences may be pruned from the set of possible bit sequences based on knowledge of the ideal bit sequence. Then the sample sequence may be compared to a set of possible bit sequences to select a decoded bit sequence.

While the present invention has been described in terms of a magnetic disk, other nonmagnetic storage devices including optical disk drives including compact disks (CD) drives such as CD-R and CD-RW, digital video disk (DVD) drives such as DVD-R, DVD+R, DVD-RW, DVD+RW, etc can likewise be implemented in accordance with the functions and features of the presented invention described herein.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to order of magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The various circuit components can be implemented using CMOS technologies such as but not limited to 0.35 micron or smaller CMOS technologies. Provided however that other circuit technologies, both integrated or non-integrated, may be used within the broad scope of the present invention. Likewise, various embodiments described herein can also be implemented as software programs running on a computer processor. It should also be noted that the software implementations of the present invention can be stored on a tangible storage medium such as a magnetic or optical disk, read-only memory or random access memory and also be produced as an article of manufacture.

Although the present invention is described in detail, it should be understood that various changes, substitutions and alterations can be made hereto without departing from the spirit and scope of the invention as described by the appended claims.

What is claimed is:

1. A method to control inter-symbol interference (ISI) comprising:
   performing a timing recovery to determine when to sample an analog signal to recover a stored bit sequence that includes a preamble, synchronization (sync) mark, data and postamble, wherein the preamble, sync mark and postamble have respective predefined series of bits;
   sampling the analog signal to generate an analog waveform, wherein a sampled bit sequence is derived from the analog waveform;
   pruning from a set of possible bit sequences, a number of bit sequences to be disallowed from bit sequence detection based on knowledge of the stored bit sequence by:
      pruning a trellis path having a predefined series of bits related to the preamble;
      pruning a trellis path having a predefined series of bits related to the sync mark;
      pruning a trellis path where parity for the data has incorrect parity; and
      pruning a trellis path having a predefined series of bits related to the postamble;
   disallowing bit sequences associated with pruned trellis paths from bit sequence detection; and
   comparing the sampled bit sequence to allowable bit sequences remaining after pruning to perform bit sequence detection to recover the stored bit sequence.

2. The method of claim 1, wherein pruning the trellis path based on parity for the data includes parity for a plurality of data code words within the data.

3. The method of claim 1, wherein the disallowing the bit sequences includes setting a distance value to exceed a limit value for the disallowed bit sequences so that comparing to the sampled bit sequence is not performed.

4. The method of claim 1, wherein performing the timing recovery determines phase and timing interval at which the analog signal is sampled.

5. The method of claim 1, wherein the sampled bit sequence is read from a read channel within a hard disk drive (HDD).

6. The method of claim 5, wherein the stored bit sequence is written using longitudinal or perpendicular recording within the HDD.

7. A method to control inter-symbol interference (ISI) within a hard disk drive (HDD) read channel, comprising:
   performing a timing recovery to determine when to sample an analog signal to recover a stored bit sequence that includes a preamble, synchronization (sync) mark, data and postamble, wherein the preamble, sync mark and postamble have respective predefined series of bits;
   sampling the analog signal to generate an analog waveform, wherein a sampled bit sequence is derived from the analog waveform;
   pruning from a set of possible bit sequences, a number of bit sequences to be disallowed from bit sequence detection based on knowledge of the stored bit sequence by:
      pruning a trellis path having a predefined series of bits related to the preamble;
      pruning a trellis path having a predefined series of bits related to the sync mark;
      pruning a trellis path where parity for the data has incorrect parity; and
      pruning a trellis path having a predefined series of bits related to the postamble;
   disallowing bit sequences associated with pruned trellis paths from bit sequence detection; and
   disallowing bit sequences associated with pruned trellis paths from bit sequence detection; and
   comparing the sampled bit sequence to allowable bit sequences remaining after pruning to perform bit sequence detection to recover the stored bit sequence.

8. The method of claim 7, wherein pruning the trellis path based on parity for the data includes parity for a plurality of data code words within the data.

9. The method of claim 7, wherein the disallowing the bit sequences includes setting a distance value to exceed a limit value for the disallowed bit sequences so that comparing to the sampled bit sequence is not performed.

10. The method of claim 7, wherein performing the timing recovery determines phase and timing interval at which the analog signal is sampled.

11. The method of claim 7, wherein comparing the sampled bit sequence uses a process that includes a Viterbi Algorithm, a Soft-Output Viterbi Algorithm (SOVA) or BCJR detector.

12. The method of claim 7, wherein the stored bit sequence is written using longitudinal or perpendicular recording within the HDD.

13. The method of claim 7, wherein comparing the sampled bit sequence includes:
   computing a distance between the sampled bit sequence and each of the allowable bit sequences;
   weighting each allowable bit sequence based on the computed distance; and
   selecting a decoded bit sequence from weights assigned to each allowable bit sequence.

14. A disk drive controller comprising:
   a read channel operable to read from a storage medium;

a data path operable to produce a decoded bit sequence from the read channel;

a second interface operable to write the decoded bit sequence to an external device; and wherein the data path is operable to:

perform a timing recovery to determine when to sample an analog signal to recover a stored bit sequence that includes a preamble, synchronization (sync) mark, data and postamble, wherein the preamble, sync mark and postamble have respective predefined series of bits;

sample the analog signal to generate an analog waveform, wherein a sampled bit sequence is derived from the analog waveform;

prune from a set of possible bit sequences a number of bit sequences to be disallowed from bit sequence detection based on knowledge of the bit sequence by:
(1) pruning a trellis path having a predefined series of bits related to the preamble;
(2) pruning a trellis path having a predefined series of bits related to the sync mark;
(3) pruning a trellis path where parity for the data has incorrect parity; and
(4) pruning a trellis path having a predefined series of bits related to the postamble;

disallow bit sequences associated with pruned trellis paths from bit sequence detection; and compare the sampled bit sequence to allowable bit sequences remaining after pruning to perform bit sequence detection to produce the decoded bit sequence.

15. The disk drive controller of claim 14, wherein pruning the trellis path based on parity for the data includes parity for a plurality of data code words within the data.

16. The disk drive controller of claim 14, wherein the data path compares the sampled bit sequence by using a process that includes a Viterbi Algorithm, a Soft-Output Viterbi Algorithm (SOVA) or BCJR detector.

17. The disk drive controller of claim 14, wherein the stored bit sequence is written on the storage medium using longitudinal or perpendicular recording.

18. The disk drive controller of claim 14, wherein comparing sampled bit sequence includes:

computing a distance between the sampled bit sequence and each of the allowable bit sequences;

weighting each allowable bit sequence based on the computed distance; and selecting a decoded bit sequence from weights assigned to each allowable bit sequence.

* * * * *